US011450098B2

(12) United States Patent
Salguero (10) Patent No.: US 11,450,098 B2
(45) Date of Patent: *Sep. 20, 2022

(54) FIREARM DETECTION SYSTEM AND METHOD

(71) Applicant: Hugo Mauricio Salguero, North Miami, FL (US)

(72) Inventor: Hugo Mauricio Salguero, North Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,731

(22) Filed: Aug. 16, 2021

(65) Prior Publication Data
US 2021/0374405 A1    Dec. 2, 2021

Related U.S. Application Data

(63) Continuation-in-part of application No. 17/009,866, filed on Sep. 2, 2020, now Pat. No. 11,093,757, which is a continuation-in-part of application No. 16/514,961, filed on Jul. 17, 2019, now abandoned.

(60) Provisional application No. 62/764,071, filed on Jul. 17, 2018.

(51) Int. Cl.
| | | |
|---|---|---|
| *G06V 20/10* | (2022.01) | |
| *F41A 17/06* | (2006.01) | |
| *G06V 10/22* | (2022.01) | |
| *G06V 40/10* | (2022.01) | |

(52) U.S. Cl.
CPC ............ *G06V 20/10* (2022.01); *F41A 17/063* (2013.01); *G06V 10/225* (2022.01); *G06V 40/10* (2022.01)

(58) Field of Classification Search
CPC .. G06K 9/00771; G06K 9/00362; G06T 7/70; G06T 2207/30196; G06T 2207/30204; G06T 2207/30232; F41H 11/00; G08B 13/196; G08B 21/0261; G08B 21/0269; H04N 5/2253; H04N 7/183; G01S 19/42
See application file for complete search history.

(56) References Cited

U.S. PATENT DOCUMENTS

| | | | | |
|---|---|---|---|---|
| 3,949,503 | A * | 4/1976 | Waress | B60Q 7/005 40/591 |
| 9,767,677 | B1 * | 9/2017 | Paulin | G08B 25/006 |
| 2004/0001142 | A1 * | 1/2004 | Kumhyr | G06K 9/00288 348/143 |
| 2011/0029009 | A1 * | 2/2011 | Dietl | F41C 27/00 606/203 |

(Continued)

OTHER PUBLICATIONS

USPTO Notice of Allowance and Fees Due, dated Apr. 29, 2021. U.S. Appl. No. 17/009,866, filed Sep. 2, 2020.
(Continued)

*Primary Examiner* — Dakshesh D Parikh
(74) *Attorney, Agent, or Firm* — Christopher Mayle; Bold IP, PLLC (57) ABSTRACT

The present invention is directed to a system and method including a firearm detection device that operates silently to identify a firearm or bullet stored in the barrel of the firearm. Utilizing a camera as well as one or more characteristics of the individual carrying the firearm whereby once scanned, the system may send an alert to the proper authorities, with the system utilizing exemption tags to properly identify authorities or other entities that are not threats as well as provide other utilities useful during an emergency situation.

1 Claim, 8 Drawing Sheets

(56) References Cited

U.S. PATENT DOCUMENTS

2014/0118554 A1\* 5/2014 Bucknor ............ G06K 9/00771
  348/155
2016/0232774 A1\* 8/2016 Noland .............. G08B 21/0438
2019/0317974 A1\* 10/2019 Chamberlin ........ G06F 16/9537
2019/0373964 A1\* 12/2019 Vann, Jr. .............. A41D 13/088

OTHER PUBLICATIONS

Non-Final Rejection, dated Nov. 25, 2020. U.S. Appl. No. 17/009,866, filed Sep. 2, 2020.

\* cited by examiner

FIREARM DETECTION SYSTEM AND METHOD

CROSS-REFERENCE TO RELATED APPLICATIONS

This application is a continuation in part which claims priority to a continuation in part 17/009,866 filed on Sep. 2, 2020 which claims priority to U.S. Non Provisional application Ser. No. 16/514,961 filed on Jul. 17, 2019 which claims priority to U.S. Provisional Application No. 62/764,071 filed on Jul. 17, 2018, which is incorporated by reference in its entirety.

FIELD OF THE DISCLOSURE

The present invention relates to sensor systems. More particularly, this invention relates to a firearm identification system and method which can identify and distinguish between threats to determine the type of firearms used in an environment.

BACKGROUND

Currently gun violence is on the rise and many American children are exposed to gun violence where annually nearly 2,900 children are shot and killed and nearly 15,600 more are shot and injured. An estimated 3 million American children are exposed to shootings per year. Handguns may easily be hidden in book bags or purses, and traditional metal detectors can slow up entryways for hours. Also during an active shooter situation authorities and bystanders are unsure as to what is occurring and do not have the needed information to appreciate the location of the shooter as well as the type of firearms used by the shooter. Conventional fire arm detection systems typically only provide limited information to law enforcement, and do not account for other firearms that are registered to authorities or emergency personnel providing aid in an emergency situation. They are also not discreet and generate a significant amount of sound or work only are activated after a firearm is shot. Thus exists a need for an improved firearm detection system and method.

SUMMARY

The disclosure presented herein relates to a firearm detection system comprising, one or more databases coupled via a network, one or more processors coupled to the one or more databases, and at least one computing device coupled to the one or more processors and the one or more databases via the network, wherein the one or more processors are configured to receive from a camera on a firearm detection device one or more content; determine if one or more objects from the content are a firearm, identify the firearm, and generate a response to the identified firearm, the response comprised of a notification to a user with identifying information of the identified firearm, further comprising an exemption tag, wherein the processors are further configured to determine an approximate location of the identified firearm, determine if the identified firearm is within a predetermined distance of a restricted area, wherein if the identified firearm is within a predetermined distance of the restricted area generate the response, identify the exemption tag, determine if the exemption tag is within a predetermined distance of the identified firearm, and update status of the identified firearm, wherein if the exemption tag is within the predetermined distance of the identified firearm designate the identified firearm as not a threat, the exemption tag having a specific color, pattern or style used as an identification marker, the exemption tag having an adhesive on a base surface, the adhesive opposite of the specific color, pattern or style, the adhesive configured tor attached to a firearm, wherein each individual exemption tag has a specific color, pattern or style corresponding to a number in a set of exemption tags, the firearm detection device having a housing mounted to a ceiling, the housing having a housing cover connected to a housing base, the housing base mounted to the ceiling, wherein the processors are further configured to determine if one or more objects from the content is a bullet from the firearm, identify the bullet from the firearm, and generate a response to the bullet from the firearm, the response comprised of a notification to a user with identifying information of the identified bullet, automatically determine if one or more objects from the content is an individual, generate a response to the individual, the response comprised of a notification to the user, compare the individual to one or more individuals stored in the one or more databases, and generate a response to the comparison, the response comprised of a notification to the user.

The disclosure presented herein also relates to a firearm detection system comprising one or more databases coupled via a network, one or more processors coupled to the one or more databases, at least one computing device coupled to the one or more processors and the one or more databases via the network, wherein the one or more processors are configured to receive from a camera on a firearm detection device one or more content, identify firearms, bullets, and one or more characteristics of individuals from the one or more content, store identified firearms, bullets, and one or more characteristics of individuals, generate a response to the identified identify firearms, bullet, and one or more characteristics of individuals, the response comprised of a notification to a user with identifying information of the identified firearm, bullet, and one or more characteristics of individuals, compare the individual to one or more individuals stored in the one or more databases, generate a response to the comparison, the response comprised of a notification to the user, determine an approximate location of the identified firearm and bullet and the individual, determine if the identified firearm and bullet and the individual is within a predetermined distance of a restricted area, wherein if identified firearm and bullet and the individual within a predetermined distance of a restricted area generate the response, generate a response to the comparison, the response comprised of the location of the identified firearm and bullet and the individual, the firearm detection device having a housing mounted to a ceiling, the housing having a housing cover connected, further comprising an exemption tag, wherein the processors are further configured to identify the exemption tag, determine if the exemption tag is within a predetermined distance of a firearm, wherein if the exemption tag is within a predetermined distance of the firearm are designate the firearm as not a threat, the exemption tag having a specific color, pattern or style used as an identification marker, the exemption tag having an adhesive on a base surface, the adhesive opposite of the specific color, pattern or style, the adhesive configured tor attached to a firearm, wherein each individual exemption tag has a specific color, pattern or style corresponding to a number in a set of exemption tags, wherein each individual exemption tag has GPS.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations, and are not intended to limit the scope of the present disclosure.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises", and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for an improved system and method for a firearm detection system with a plurality of computing devices connected to a firearm detection device. The firearm device is designed to operate silently to identify a firearm or a bullet stored in the barrel of the firearm utilizing a built in camera on the firearm detection device. The firearm detection system may then detect which type of firearm an individual is carrying as well as one or more characteristics of the individual such as their hair, height, clothes, and sex. Once scanned and identified, the firearm detection system may send an alert or notification to the police, paramedics, or a security group associated with the building where the firearm detection device is positioned or otherwise located. The firearm detection system may utilize one or more exemption tags attached to firearms or other objects in proximity to the firearms to properly identify authorities or other entities that the firearms are not threats as well as provide other utilities useful during an emergency situation.

Figure 1:
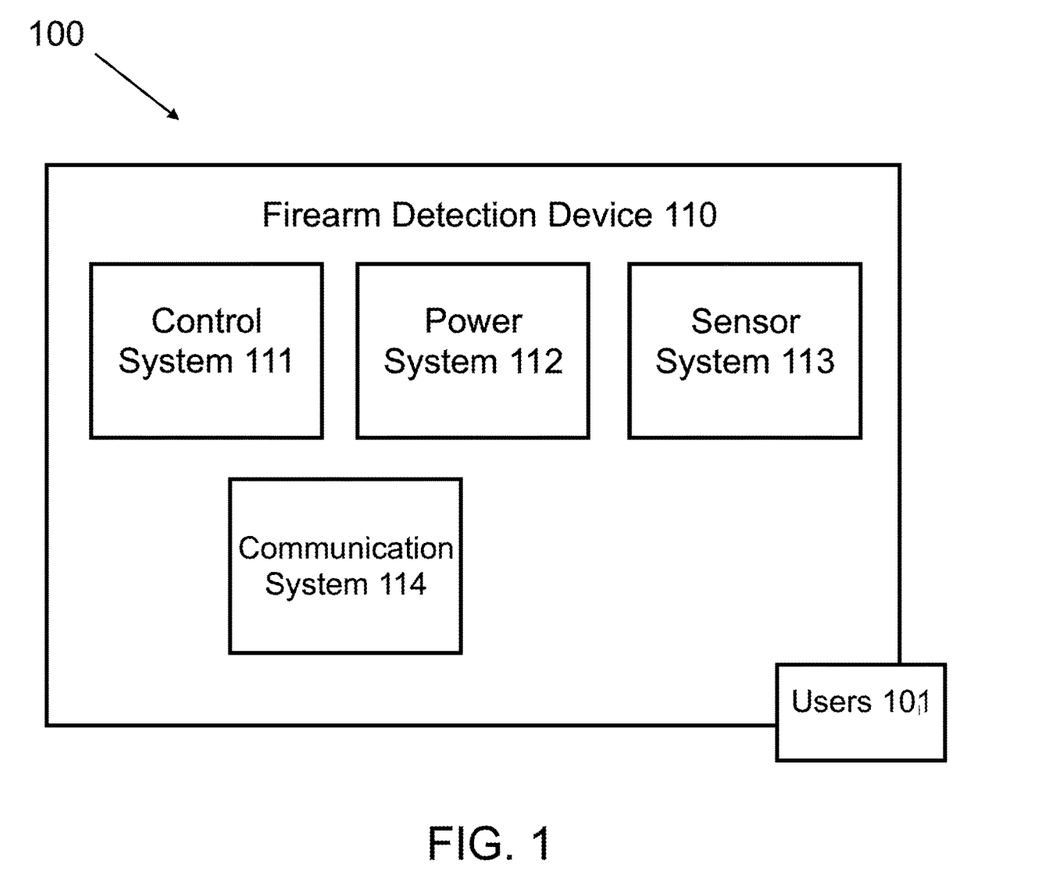
FIG. 1 shows a block diagram of the various systems of firearm detection system.

With reference now to FIG. 1, FIG. 1 illustrates a block diagram of one exemplary embodiment of firearm detection system 100. Firearm detection system 100 may be utilized by one or more users 101. Users 101 may include emergency personnel such as the police, firefighters, paramedics, security personnel, or any other type of individual designated to protect or otherwise provide care to one or more locations such as an office building, hospital, school, an establishment or other location.

Firearm detection system 100 may include a firearm detection device 110 having a plurality of systems including a control system 111, a power system 112, a sensor system 113, and a communication system 114, which may be integrated into the overall system and structure of gun firearm detective device 110. The various systems may be individually configured and correlated with respect to each other so as to attain the desired objective of monitoring connected locations.

Power system 112 of firearm detection system 100 provides power to sensor system 113, communication system 114 and the circuits and components of control system 111 during the process of identification of one or more bullets, firearms, or individuals at one or more targeted locations and transmission data corresponding to the bullets, firearms, or individuals to users 101. Firearm detection system 100 may be implemented using standard electrical components conventionally used to implement smoke alarm systems or other similar apparatuses and may be powered by methods known by those of ordinary skill in the art.

In some non-limiting embodiments, firearm detection system 100 may plug into an electrical outlet using an electrical cord to supply power to sensor system 113, communication system 114, and the circuits and components of control system 111. Further, power system 112 may include a rechargeable battery pack whereby the rechargeable battery is of a charge, design, and capacity to provide sufficient power to sensor system 113, communication system 114 and the circuits and components of control system 111 while operating firearm detection device 110 for the needed amount of time.

Control system 111 may operate to control the actuation of the other systems. Control system 111 may have a series of computing devices which will be discussed in detail later in the description. Control system 111 may be in the form of a circuit board, a memory or other non-transient storage medium in which computer-readable coded instructions are stored and one or more processors configured to execute the instructions stored in the memory. Control system 110 may have a wireless transmitter, a wireless receiver, and a related computer process executing on the processors.

Computing devices of control system 110 may be any type of computing device that typically operate under the control of one or more operating systems, which control scheduling of tasks and access to system resources. Computing devices may be a phone, tablet, desktop computer, laptop computer, networked switch, networked bridge, or any computing device capable of executing instructions with sufficient processor power and memory capacity to perform operations of control system 110. Firearm detection system 100 may have location tracking capabilities such as Mobile Location Determination System (MLDS) or Global Positioning System (GPS) whereby they may include one or more satellite radios capable of determining the geographical location of firearm detection system 100. Firearm detection system 100 may also have a manually stored location.

The one or more computing devices may be integrated into control system 111, while in other non-limiting embodiments, control system 111 may be a remotely located computing device or server configured to communicate with one or more other control systems 111. Control system 111 may also include an internet connection, network connection, and/or other wired or wireless means of communication (e.g., LAN, etc.) to interact with other components. The connection allows users 101, to update, control, send/retrieve information, monitor or otherwise interact passively or actively with control system 111.

Control system 111 may include control circuitry and one or more microprocessors or controllers acting as a servo control mechanism capable of receiving input from sensor system 113 and communication system 114, analyzing the input from sensor system 113 and communication system 114, and generating an output signal to communication system 114 and power system 112. The microprocessors (not shown) may have on-board memory to control the power that is applied to power system 112, and communication system 114 in response to input signals sensor system 113.

Control system 111 may include circuitry to provide an interface for users 101 to interact with, including switches and indicators and accompanying circuitry for an electronic control panel or mechanical control panel. Such an interface may present options to user 101 to select from that would allow user 101 to manipulate controls and insert override commands. Control system 111 may be preprogrammed with any references values, by any combination of hardwiring, software, and firmware to implement various operational modes including, but not limited to, temperature, light, and humidity values.

The microprocessors in control system 111 may also monitor the current state of circuitry within control system 111 to determine the specific mode of operation chosen by the user. For instance, when "on", the microprocessors may begin autonomous identification of the proximity around firearm detection device 110. Further, such microprocessors that may be part of control system 111 may receive signals from any of or all systems, including without limitation, power system 112, sensor system 113, and communication system 114. Such systems may be notified whether any of the components in the various systems need to be replaced.

Figure 2:
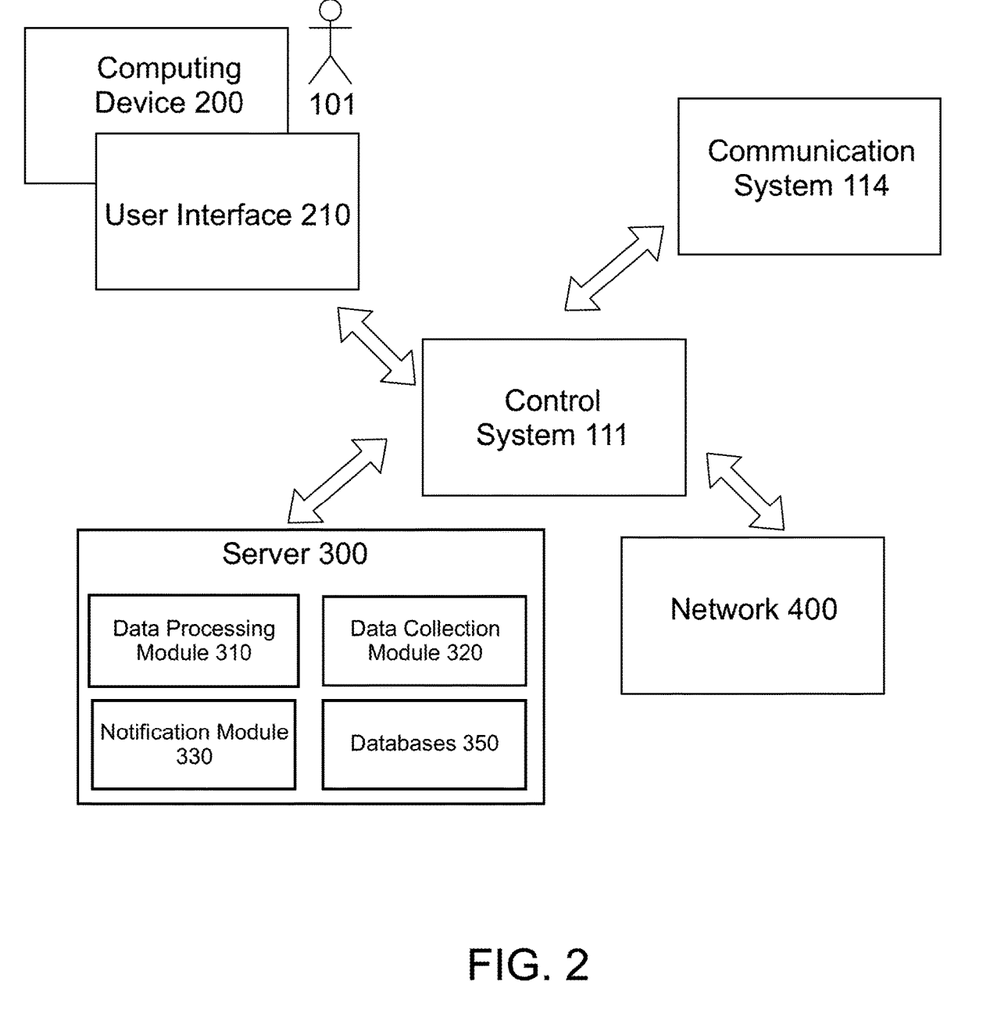
FIG. 2 shows an exemplary block diagram of communication system of firearm detection system.

Turning to FIG. 2, FIG. 2 shows an exemplary block diagram of a communication system of firearm detection system 100. Control system 111 may be in communication with communication system 114, as illustrated in FIG. 2, to connect with other or computing devices whereby signals transmitted from the computing devices may be received by control system 111. Communication system 114 may allow a user 101 to interact with control system 111 using a computing device 200 even if user 101 is not proximate to control system 111 or firearm detection device 110. User 101 may access a user interface 210 using computing device 200. User interface 210 may have a plurality of buttons or icons that are selectable by users 101 for communication system 114 to perform particular processes in response to the selections. In one or more non-limiting embodiments, communication system 114 may be innate, built into, or otherwise integrated into existing platforms or systems such as a website, a third party program, Apple™ operating systems (e.g. iOS), Android™, Snapchat™, Instagram™, Facebook™, or any other platform.

Computing device 200 may be similar to the computing devices of control system 111 and may be any type of computing device that typically operates under the control of one or more operating systems, which control scheduling of tasks and access to system resources. Computing device 200, may in some embodiments, be a computing device such as an iPhone™ Android-Based™ phone, or Windows-Based™ phone, a tablet, television, desktop computer, laptop computer, gaming system, wearable device electronic glasses, networked router, networked switch, networked bridge, or any computing device capable of executing instructions with sufficient processor power and memory capacity to perform operations of firearm detection system 100 while in communication over the network. Computing device 200 may have location tracking capabilities such as Mobile Location Determination System (MLDS) or Global Positioning System (GPS) whereby they may include one or more satellite radios capable of determining the geographical location of computing device 200.

In some embodiments, computing devices 200 may be in communication with one or more servers 300 via communication system 114 or one or more networks 400 connected to communication system 114. Server 300 may be located at a data center, or any other location suitable for providing service to network 400 whereby server 300 may be in one central location or in many different locations in multiple arrangements. Server 300 may comprise a database server such as MySQL® or Maria DB® server. Server 300 may have an attached data storage system storing software applications and data. Server 300 have may a number of modules that provide various functions related to communication system 114. Modules may include a data processing module 310, data collection module 320, and notification module 330. Modules may be configured to receive commands or requests from computing devices 200, server 300, and outside connected devices over network 400. Server 300 may comprise components, subsystems and modules to support one or more management services for communication system 114.

For instance, data processing module 310 may be configured to analyze relevant image and video collected by firearm detection device 110. Data processing module 310 may utilize descriptive and predictive data-mining capabilities based on previously recognized data collected.

Modules may be in the form of software or computer programs that interact with the operating system of server 300 whereby data collected in databases such as databases 350 may be processed by one or more processors within server 400 or computing device 200 or firearm detection device 110 as well as in conjunction with execution of one or more other computer programs. Software instructions for implementing the detailed functionality of the modules may be written in or natively understand C, C++, Visual Basic, Java, Python, Tcl, Perl, Scheme, Ruby, etc.

In one or more non-limiting embodiments, network 400 may include a local area network (LAN), such as a company Intranet, a metropolitan area network (MAN), or a wide area network (WAN), such as the Internet or World Wide Web. Network 400 may be a private network or a public network, or a combination thereof. Network 400 may be any type of network known in the art, including telecommunications network, a wireless network (including Wi-Fi), and a wireline network. Network 400 may include mobile telephone networks utilizing any protocol or protocols used to communicate among mobile digital computing devices (e.g. computing device 104), such as GSM, GPRS, UMTS, AMPS, TDMA, or CDMA. In one or more non-limiting embodiments, different type of data may be transmitted via network 400 via different protocols. In alternative embodiments, computing devices 200, may act as standalone devices or whereby they may operate as peer machine in a peer-to-peer (or distributed) network environment.

Network 400 may further include a system of terminals, gateways, and routers. Network may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if for instance they are in a remote location not accessible by other networks.

Figure 3:
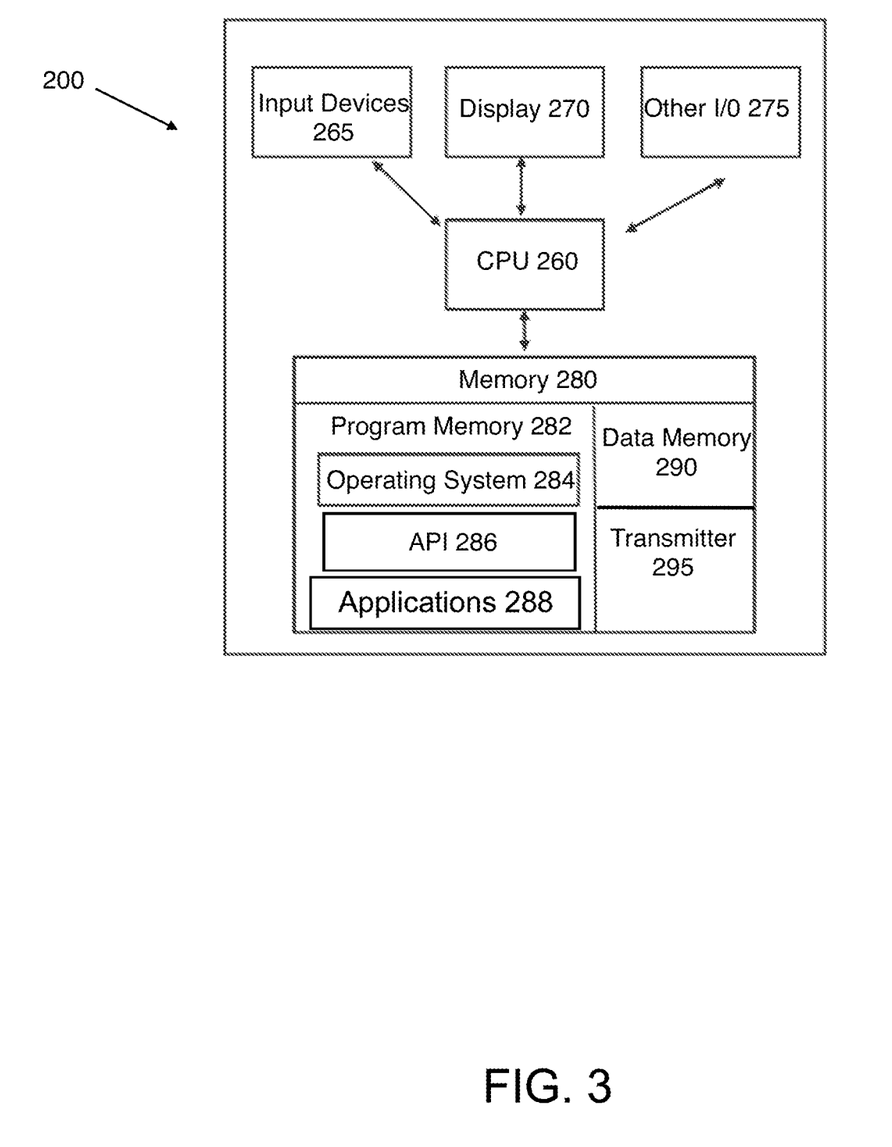
FIG. 3 shows an exemplary block diagram of various components of a computing device.

Turning to FIG. 3, FIG. 3 is a block diagram showing various components of computing device 200. Computing device 200 may comprise a housing for containing one or more hardware components that allow access to edit and query communication system 114. User Computing device 200 may include one or more input devices such as input devices 265 that provide input to a CPU (processor) such as CPU 260 of actions related to user 101. Input devices 265 may be implemented as a keyboard, a touchscreen, a mouse, via voice activation, wearable input device, a camera a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programing interface (API), such as API 286, and other computerized programs or application programs such as application programs 288 such as firearm detection application 288. Memory 280 may also include data memory such as data memory 290 that may include database query results, configuration data, settings, user options, user preferences, or other types of data, which may be provided to program memory 282 or any element of user computing device 115.

Computing device 200 may have a transmitter, such as transmitter 295, to transmit data. Transmitter 295 may have a wired or wireless connection and may comprise a multi-band cellular transmitter to connect to the server 300 over 2G/3G/4G cellular networks. Other embodiments may also utilize Near Field Communication (NFC), Bluetooth, or another method to communicate information.

Figure 4:
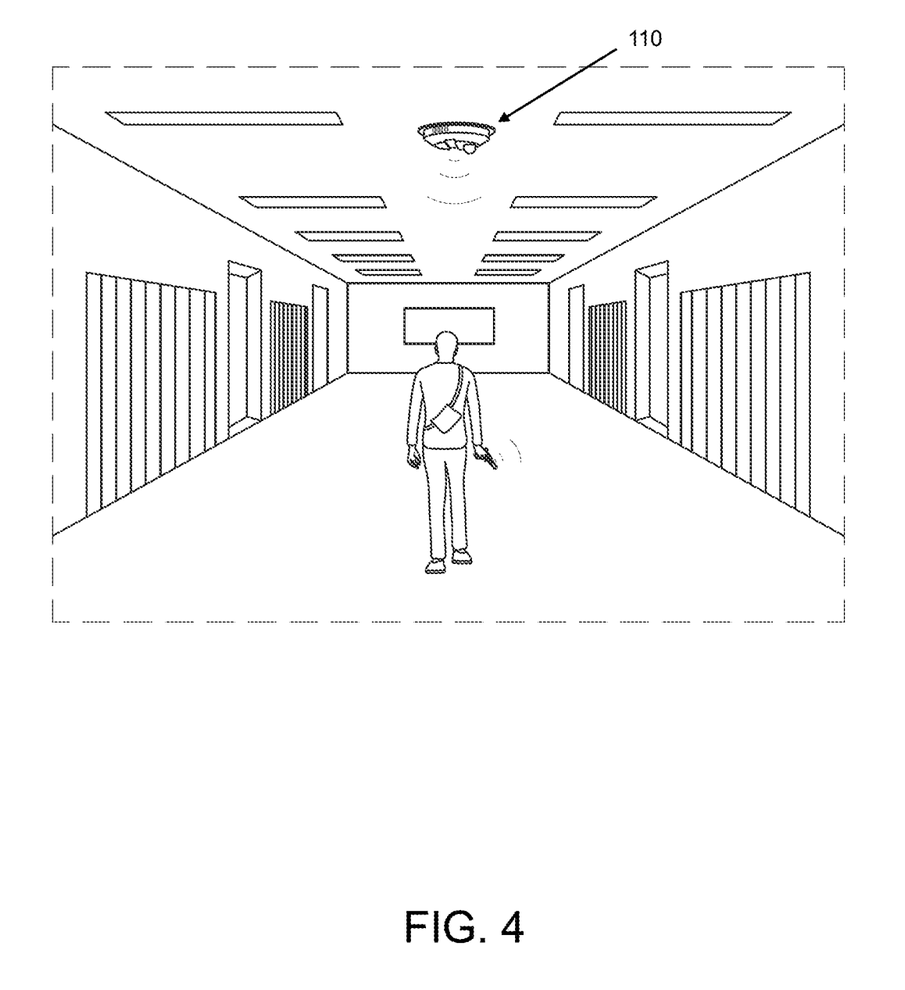
FIG. 4 depicts an illustration of firearm detection system in an environment in accordance with the present invention.
Figure 5:
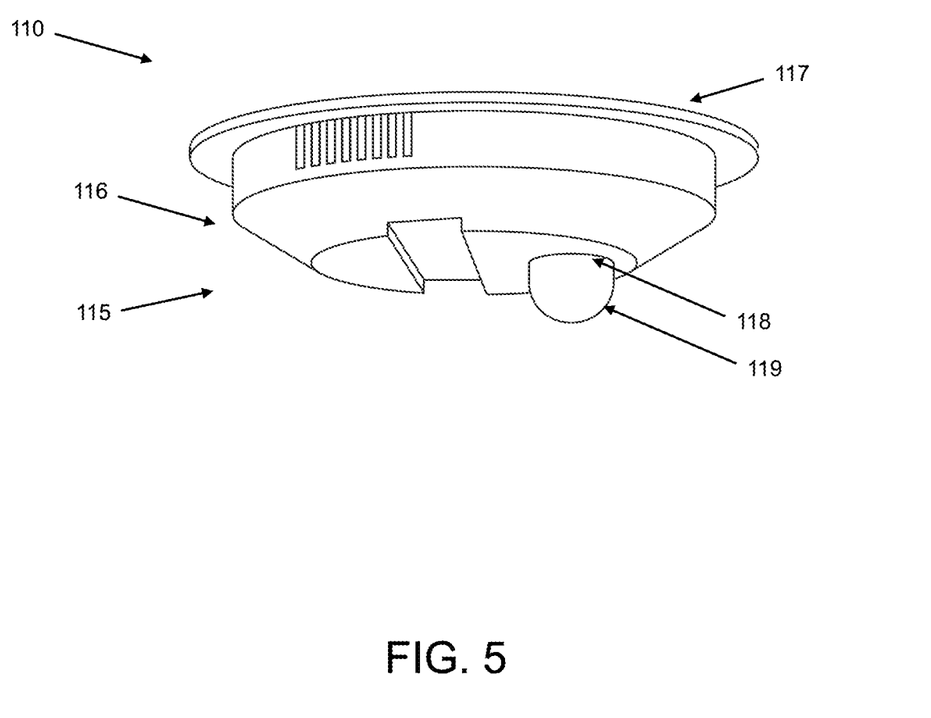
FIG. 5 shows a perspective view of firearm detection system.

Turning to FIG. 4 and FIG. 5, FIG. 4 and FIG. 5 show an illustration of an exemplary firearm detection device 110 using firearm detection system 100. Firearm detection device 110 may have a housing body 115 including a housing cover 116 and a housing base 117. Housing cover 116 may be removably coupled to the housing base 117. A through-hole 118 is formed in the housing cover 116 to allow camera 119 or other device to be positioned. Housing base 117 is mountable to a surface (e.g., a ceiling or a wall illustrated in FIG. 4). One or more components of firearm detection device 110 may be housed inside housing cover 116 and may be coupled to the housing base 117.

Sensor system 113 of firearm detection device 110, as shown in FIG. 1, may include a plurality of detectors mounted or otherwise connected to control system 111. Sensor system 113 may include camera 119 having any type of capture device for capturing an image or video. Camera 119 may be an omnidirectional camera that may receive pictures or video from a 360 degrees field of view which may then be received by control system 111 and transmitted to communication system 114. In some embodiments, camera 119 may be a color and depth camera, a webcam, a 3D camera, or any other type of capture device. The image may be captured and stored as image data. The capture data may include photographs and/or videos.

Camera 119 may have a communication interface to communicate with control system 111 to transmit image data and may transfer the data through communication system 114. Control system 111 may automatically adjust camera 119 settings to optimize clear recordings of the area (e.g., pan-tilt-zoom, focus, infrared-mode, and increasing framerate). Camera 119 may utilize sensors such as a Charged-Coupled Device (CCD) or Complementary Metal-Oxide Semiconductor (CMOS) to sense a captured scene. The sensors in the camera may capture light reflected from the scene taken and translate the strength of that light into a numeric reading by passing light through a number of different color filters whereby the readings are combined and evaluated via software to determine the specific color of each segment of the picture.

Sensors may have infrared ("IR") detectors having photodiode and related amplification and detection circuitry to sense the presence of people in the room or location. In one or more other non-limiting embodiments, radio frequencies, magnetic fields, and ultrasonic sensors and transducers may be employed. Sensors may be arranged in any number of configurations and arrangements. Sensors may be configured to send and receive information over network 400, such as satellite GPS location data, audio, video, and time, to server 300 and stored in the one or more databases 350. Individuals location at a specific time or time period may be determined while the individuals are moving from one physical location to the next physical location. In one or more non-limiting embodiments, camera 119 may be used to track the x y z coordinates of individuals on one or more planes with respect to the individual. Data collection module 320 may analyze an individual's position as they navigate the range of geographic coordinates in the real world such as when they are moving to and from one point to another in real time.

Sensor system 113 may have a connected speaker assembly that converts an electrical signal from the control system 111 into an audible sound. The speaker may be mounted to the housing of gun detection firearm device 110 such that audible sound from the speaker has access to the exterior of the housing of gun detection firearm device 110 where it then may be heard in the targeted location. The purpose of the speaker may be to allow the transmission of an auditory signal to alert the presence of a shooter to a bystander. In some embodiments, control system 111 may be connected to a microphone that allows for the passage of sound into control system 111 to receive auditory signals from a person in proximity. Control system 111 may also have the necessary circuitry to amplify and convert the signal to speaker and to convert the signal from microphone to control system 111. The speaker assembly may also operate as microphone configured to receive and process sound into electrical signals.

In some embodiments sensor system 113 may have a light sensor which produces an input signal indicative of the intensity of the ambient light within a room or other location in which firearm detection device 110 is located. Control system 111 may receive this signal from sensor system 113, whereby the microprocessors then compare the received input value from sensor system 113 using a comparison function and are able to evaluate the input data against a setting or expectation of a certain reference value stored within the memory of control system 111. Control system 111 determines that a firearm may be being used when lights of are detected.

In some embodiments sensor system 113 may include a LED status indicator allowing for the viewing of light emitting from an LED status indicator. The LED status indicator notifies user 101 that something has changed with the mechanics of gun detection firearm device 110. This change may be a low battery indicator to signal to the owner that the life of an internal battery has reached a level of capacity lower than a certain threshold. The LED status indicator may be a light emitting diode that flashes periodically or emits a continuous light when there is a change in the status of firearm detection device 110.

Sensor system 113 may have a temperature sensor in any suitable position with respect to firearm detection device 110 in order to measure, either directly or indirectly, a temperature associated with or in the general proximity of firearm detection device 110 in any suitable manner. For example, the temperature sensor can include one or more (or any suitable combination) of the following components or devices: a resistive element, a strain gauge, a temperature probe, a thermistor, a resistance temperature detector (RTD), a thermocouple, a thermometer (liquid-in-glass, filled-system, bimetallic, infrared, spot radiation), a semiconductor, an optical pyrometer (radiation thermometer), a fiber optic device, a phase change device, a thermowell, or a thermal imager. Control system 111 may measure the temperature, and the microprocessors can then compare the received input value from sensor system 113 using a comparison function and evaluate the input data against a setting or expectation of a certain reference value stored within the memory of control system 111. Control system 111 analyzes received input value from sensor system 113 using a comparison function and evaluates the input data.

Figure 6:
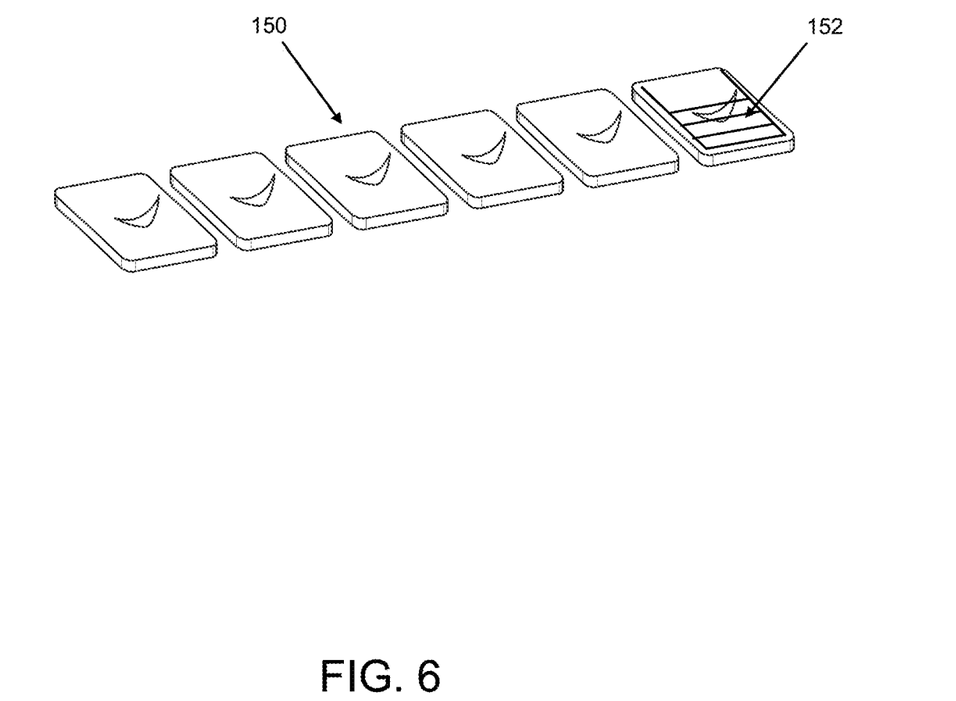
FIG. 6 shows a perspective view of the exemption tags.
Figure 7:
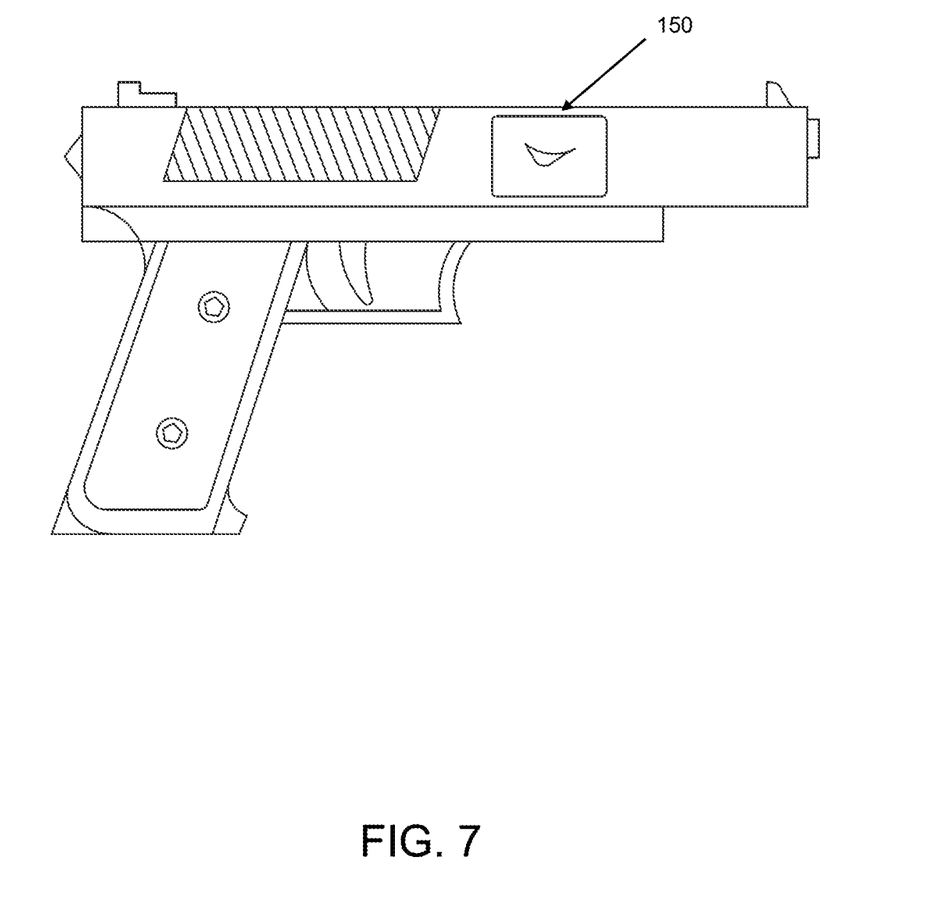
FIG. 7 shows a perspective view of the exemption tag on a firearm.

In one or more non-limiting embodiments, firearm detection system 100 may include one or more exemption tags 150, as illustrated in FIG. 6. Exemption tags 150 act as an identification device on a firearm, as illustrated in FIG. 7, or other object for a user 101 indicating that the user 101 is not a threat and is allowed to carry such firearms within the vicinity of firearm detection device 110. Exemption tags 150 allow modifications to the standard operation of firearm detection system 100 such as if a firearm has an exemption tag 150 placed on it, the firearm would not be registered as a threat.

Exemption tags 150 may be rectangular in shape have a specific color, pattern or style to be recognized by firearm detection system 100. In some embodiments exemption tags 150 may be a QR code or bar code with a GPS locator placed inside whereby data processing module 310 may track the location of the exemption tags 150. This may be useful if additional information is needed whereby by a user 101, a drone, or other automated device may be dispatched to the location and know where exemption tags 150 is placed or positioned.

Exemption tags 150 may have a medical grade adhesive coated on at least a portion of the surface of the base surface, opposite of the specific color, pattern or style, for adhering to a firearm or entity in proximity to the firearm that may be identified by the firearm detection system 100. Exemption tags 150 should be made of a material for increased durability so it will not easily tear when used. In one or more non-limiting embodiments, a releasable liner may cover the adhesive so as to protect the adhesive from adhering to other objects before use.

Exemption tags 150 may be connected to network 400 and have a switch whereby when the switch is turned on, exemption tag 150 may receive a notification through user interface 210 that the switch has been turned on and where the location of exemption tags 150 is. Exemption tags 150 may have a specific color, pattern or style pertaining to the specific number in a set of which the specific exemption tags 150 corresponds to. For instance if there are exemption tags 150 in a building, user 101 would know the correct exemption tag 150 and a corresponding user 101 that needs assistance based on the GPS location of exemption tag 150. A map may be generated with the various exemption tags 150 to triangulate positions and determine a safe area for people with exemption tags 150. In other non-limiting embodiments exemption tags 150 may broadcast a small network to connected computing devices to receive transmission from a central command and other computing devices connected with exemption tags 150

Information related to objects classified as relating to authorities and exemption tags 150 may also be presented with a geo-spatial environment having a virtual map of the geographical location in which objects are located. The virtual map may have geography and topography, which parallels the geography and topography of the physical real world.

An exemption tag's position on the virtual map may correspond to their position in the real world. For instance, if an exemption tag 150 was at the corner of 1st and 2nd street in the real world, exemption tag 150 may be presented in a corresponding position on the virtual map pertaining to the corner of 1st and 2nd street. Identifiers may also be used for the identified firearm, bullets, and the individual.

For instance, a range of longitudinal and latitudinal coordinates defining a geographic area or space in the real world may be mapped to a corresponding range of longitudinal and latitudinal coordinates defining a virtual space on the virtual map as well as each individual coordinate in the range. The graphical map may be displayed with content and objects displayed as markers, pins, or identifiers at their respective locations including indicia showing if the object was integrated at that location in real time or at a previous time.

In further embodiments exemption tags 150 may have different status indicators of which user 101 may manipulate corresponding to a surrounding event. For instance, exemption tags 150 may have a slidable element 152 that when in a first position may signal that the surrounding environment is safe or in a second position that user 101 is need of assistance. In some embodiments there may be multiple positions such as three or more. This allows users 101 to communicate automatically as well as silently so as to not alert an active shooter of their current whereabouts or plan of action. The various status indicators may be displayed on the map. Authorities may also hand out safety tags similar to exemption tags to various individuals found in a crisis whereby the information and there whereabouts may be transmitted through firearm detection system 100. Of course, the school systems may already have these as well. For instance, if an officer hands a safety tag to a child found secure, he may then identify the child whereby the officer may insert the child's name in the connected computing device whereby the name and location of the safety tag will be broadcasted through firearm detection system 100.

When activating firearm detection system 100, a user 101 may initially register to become a registered user associated with communication system 114 through firearm detection application 288. In one or more non-limiting embodiments, firearm detection application 288 may be innate, built into, or otherwise integrated into existing social media platforms or systems such as a website, a third party program, Apple™ operating systems (e.g. iOS), Android™, Snapchat™ Instagram™, Facebook™, or any other platform whereby information may be transmitted to these third party platforms. Firearm detection application 288 may be downloadable and installable on computing devices 200. In one or more non-limiting embodiments, firearm detection application 288 may be preinstalled on computing devices 200 by the manufacturer or designer. Further, firearm detection application 288 may be implemented using a web browser via a browser extension or plugin. Server 300 may associate computing devices 200 with an account during the registration process. The account may be user specific or specific to a home, enclosure, or other physical boundary that includes multiple users 101, and a unique identification of each of computing devices 200 may be stored in the account on databases 350.

Upon successful authentication of a user 101 though firearm detection application 288, a dashboard or home page may be generated for simplified presentation to users 101. The homepage may be modified, deleted, written to, or otherwise administered by their respective user. Display to user through user interface 210 may comprise a number of different subpages viewable or accessible through user interface 210 by selecting one or more tabs or other methods.

User interface 210 on computing devices 200 may display multiple firearm detection devices 110 that are registered or otherwise accessible to users 101 at a location they are at or a remote location whereby they may retrieve transmission from the one or more firearm detection devices 110 Once registered, users 101 may receive notifications concerning data transmitted from firearm detection devices 110 through server 400 or directly by firearm detection devices 110.

User interface 210 may display information to users 101 who have registered or are otherwise associated with one or more firearm detection devices 110. A status for each firearm detection devices 110 may be displayed on a list. In one embodiment, the list may be a dynamic list in which firearm detection devices 110 are ordered according to the current status of each. When a firearm detection device 110 is not connected, a status is not displayed for firearm detection device 110, or in some embodiments, firearm detection device 110 may be indicated as not connected.

Figure 8:
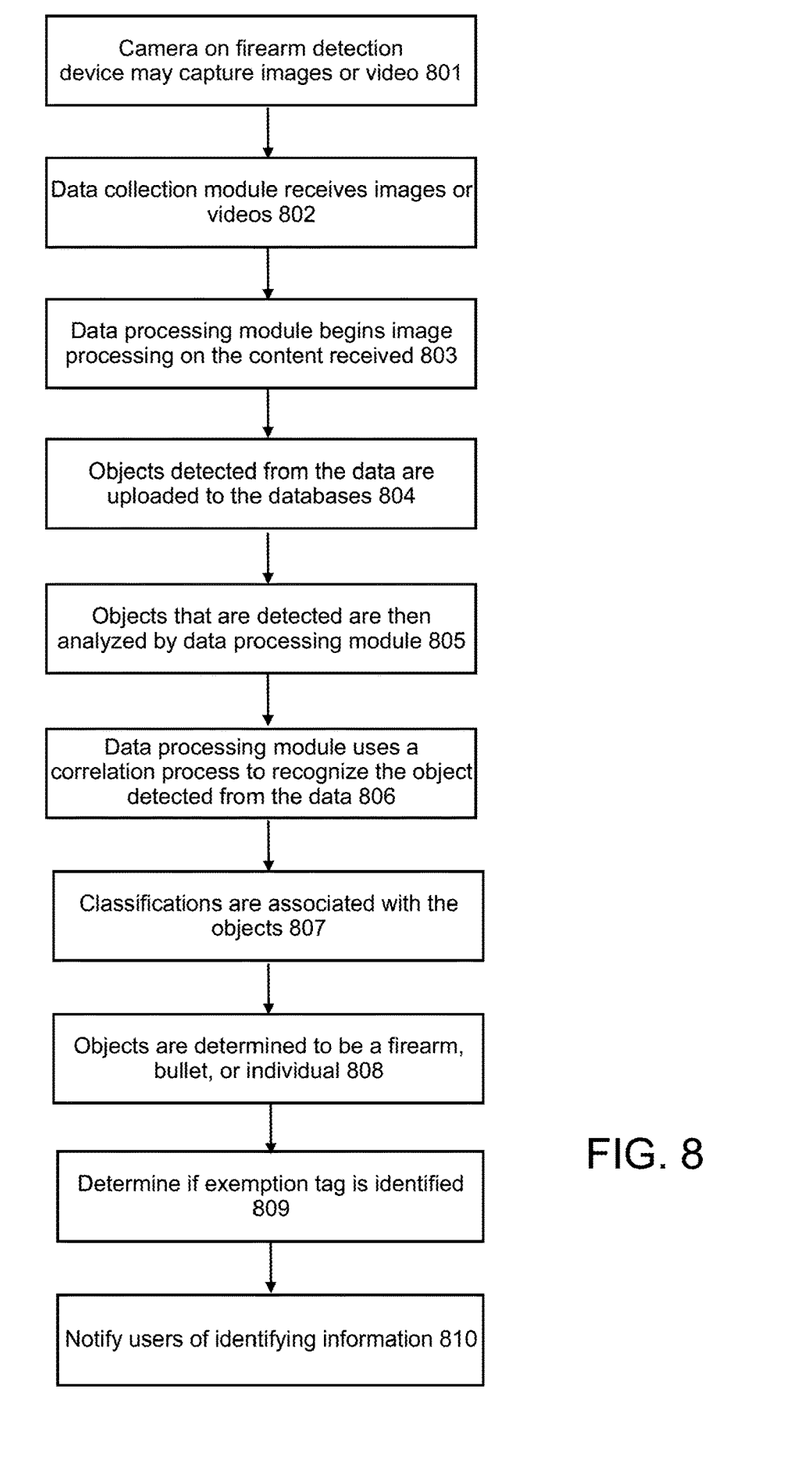
FIG. 8 illustrates an exemplary method that may be designed primarily for firearm detection system operations

FIG. 8 illustrates an exemplary method that may be designed primarily for firearm detection system 100 operations. At step 801, camera 119 on firearm detection device 110 may capture images or video of the surrounding area via embedded software and hardware.

At step 802, concurrently or linear with step 801, data collection module 320 may receive images or video including those intimated in the aforementioned description whereby at step 803, data processing module 310 may begin image processing on the content received. To do so, data processing module 310 may natively understand C, C++, Visual Basic, Java, Python, Tcl, Perl, Scheme, Ruby, etc.

Data processing module 310 may natively have Optical Character Recognition (OCR) technology that may detect and recognize one or more types of objects from the image or video received from communication system 114 and may use any technology currently implemented, such as CoCo, Metal, or similar known by those of ordinary skill in the art. For example in some embodiments OCR is a task in computer vision that involves identifying the presence, location, and type of one or more objects in a given image or video. Data processing module 310 may integrate Artificial Intelligence and Machine Learning known by those of ordinary skill in the art. Data processing module 310 may perform detection processes for different types of image, including audio, video, or other identifying objects collected from the image or video. After image or video content collected by data collection module 320, data processing module 310 may analyze whether the data is an audio, image, or video based on file type (codec)/file size.

At step 804, objects detected from the data by data processing module 310 may then be uploaded to the one or more databases 350 with additional fields cataloging various objects displayed in each image or video, as well as objects identified from audio or text into various descriptors. The completeness of the catalog of objects with identifiable descriptors that are presented to users 101 may sometimes be time intensive, so the next step of analyzing objects can occur contemporaneously with the system's continued effort to receive identified objects using multiple redundancies and algorithms corresponding to such factors as time and location.

At step 805, objects that are detected are then analyzed by data processing module 310. Different recognition results may be generated for different types of objects. For persons, data processing module 310 may identify objects such as exact identity, race, ethnic, and gender classification, hair color or shape. For objects having text, the recognition information may correspond to alphanumeric characters. These characters may be identified as text or estimates of the text carried on the detected object or in information related to an object such as an Instagram® post that accompanies a picture that has been posted on a social media account. For other types of objects, the recognition information may indicate or identify objects corresponding to what the detected object is, the class of the detected object, a distinguishing characteristic of the detected object, or an identity of the detected object. In some embodiments when an image or video is uploaded, interference jobs may be ran, returning labels of detected objects and the image coordinates of the corresponding objects. Using this new information, images may be generated populated with rectangles around the objects. Separate images may be generated for each object category.

Data processing module 310 may recognize different levels of granularity corresponding to the objects found in inputted content. In the case where the detected object is a person, the object may correspond to an identification signature that serves as a unique identifier of that person so as to identify an individual from any other individual in a collection of images depicting hundreds of other people. While in one or more non-limiting embodiments, data processing module 310 may only be able to identify an object as a person belonging to a set of persons that are identifiable from other persons in the same pool of people. For example, the object may identify people by ethnic class or gender or identify a person as being one of a limited number of matching possibilities. For facial recognition, data processing module 310 may in addition or instead use data from one or more external databases, social networking sites, professional data services, or other such entities.

At step 806, data processing module 310 may use a correlation process to recognize the object detected from the data to determine if the object is a firearm, an individual, a bullet, or other entity. Various types of functionality may be enabled with the correlation process, including for example, search, categorization, and text object research whereby data processing module 310 pings existing product, facial, object, etc. known databases such as databases 350. Data processing module 310, depending on the object, may then interpret subject(s) and other details from the content or interpret firearm based on shape, size, color, type, brand, year created, and other details.

In one or more non-limiting embodiments, the object detected may be a person, or portion of a person such as their hair, face, leg, or arm. Numerous other types of objects may be detected by data processing module 310 including objects carrying text or other alphanumeric characters, and objects associated with people for purpose of identifying a brand of bullet, firearm, or individual.

At step 807, during this analysis of objects, processes may be performed by data processing module 310 on objects which enables classifications to be associated with the objects into a hierarchical structure to facilitate analysis, searching, and recognition of firearms and individuals. Objects may be identified using a descriptor for creating the hierarchical structure. Objects associated with the analyzed content, includes descriptors which identify characteristics of the content and any feature clusters associated with the content. The descriptors may be defined in a hierarchical tree structure with the top-level descriptor mapping to the highest branch. For each branch descriptor, labels may be assigned and stored in the databases 350 to facilitate presentation to a user 101. From each branch descriptor, additional branches may be defined, for example, second-level branch descriptors that branch off from the first branch descriptor. Additional branch descriptors may branch off from the second brand descriptor. Each descriptor is associated with clusters of features that are common to objects and can be mapped together.

At step 808, after the objects have been identified and classified and are determined to be a firearm or bullets within a firearm, the method may include determining a location of the firearm, one or more exemption tags 150, and the individual carrying the firearm whereby a distance between the location of the firearm is automatically calculated. If the firearm within a predetermined distance of a designated restricted area such as a school or office building, that may be preset by user 101, data processing module 310 may determine if an exemption tag 150 is also identified with a predetermined range of the firearm, at step 809. A route may also be determined based on the trajectory of the bullets whereby a map will be presented with the locations struck by the bullets and a determined route of the individual based on where they have been firing.

Once it is determined if an exemption tag 150 is also identified with a predetermined range of the firearm and the status of the exemption tag 102, notification module 330 may notify users 101 through user interface 210 of data pertaining to the firearm, bullets from the firearm, any individuals, including any identifying information and location as well identifying information pertaining to of any exemption tag 150 identified, at step 810. In some embodiments the method may also include automatically determining and presenting if the firearm is within a preset distance of the one or more exemption tags 150 and calculating a distance between the location of the firearm and the exemption tags 150. In further embodiments, notification module 330 may generate synchronization messages, such as an email message, text message, or calendar invitation to users 101 registered to firearm detection system 110.

Data processing module 310 may also determine objects related to the location and time of individuals, firearms, or bullets, using data acquired from firearm detection device 110. Doing this determination allows system 100 to collect in near real-time and present to users 101 a route of a suspect or other individual. Data collection module 310 may also receive information from external databases or other apparatuses connected over network 400 such as mobile computing device of user 101, wearables, or other smart connected sensors or devices such as red light cameras and other municipal surveillance cameras to further determine the location of a firearm or an individual as well as the time and how they arrived at the location and their current path.

In one or more non-limiting embodiments, data processing module 310 may group or categorize objects from location and time in a way that efficiently allocates locational and computational capacity to each received geographic and time received from images or videos collected by multiple firearm detection devices 110. Utilizing this information, data processing module 310 may compare the location and time of an individual or firearm to determine if the individual has most recently been at this location as well as their current path. Utilizing multiple firearm detection devices 110, data processing module 310 may determine the location and an accurate timestamp for the first and latest appearance of a firearm or an individual using the data from multiple firearm detection devices 110 whereby if any firearm detection devices 110 are outliers in relation to the other data they may be disregarded.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A firearm detection system comprising:
   one or more databases coupled via a network;
   one or more exemption tags;
   one or more processors coupled to the one or more databases; and
   at least one computing device coupled to the one or more processors and the one or more databases via the network;
   wherein the one or more processors are configured to:
   receive from a camera on a firearm detection device one or more content;
   determine if one or more objects from the one or more content are a firearm;
   identify the firearm; and generate a response to the identified firearm, the response comprised of a notification to a user with identifying information of the identified firearm;
   generate a virtual map with a location of the firearm displayed as an indicator on the virtual map;
   identify the one or more exemption tags;
   determine if the one or more exemption tags are within a predetermined distance of the identified firearm;
   update a status of the identified firearm, wherein if the one or more exemption tags are within the predetermined distance of the identified firearm designate the identified firearm as not a threat;
   determine if the one or more objects from the one or more content is a bullet from the firearm; and
   identify the bullet fired from the firearm.

\* \* \* \* \*